US008074440B2

(12) United States Patent  (10) Patent No.: US 8,074,440 B2
Kohlenberg et al.  (45) Date of Patent: Dec. 13, 2011

(54) GAS TURBINE ENGINE WITH AXIAL MOVABLE FAN VARIABLE AREA NOZZLE

(75) Inventors: Gregory A. Kohlenberg, Meriden, CT (US); Sean P. Zamora, Coventry, CT (US)

(73) Assignee: United Technologies Corporation, Hartford, CT (US)

( * ) Notice: Subject to any disclaimer, the term of this patent is extended or adjusted under 35 U.S.C. 154(b) by 1143 days.

(21) Appl. No.: 11/843,675

(22) Filed: Aug. 23, 2007

(65) Prior Publication Data

US 2009/0053058 A1  Feb. 26, 2009

(51) Int. Cl.
   F02K 3/02 (2006.01)
(52) U.S. Cl. .................... 60/226.3; 60/226.1
(58) Field of Classification Search ...... 60/226.1–226.3, 60/262, 229; 239/265.31
See application file for complete search history.

(56) References Cited

U.S. PATENT DOCUMENTS

| 3,779,010 | A | | 12/1973 | Chamay et al. |
|---|---|---|---|---|
| 3,820,719 | A | | 6/1974 | Clark |
| 4,327,548 | A | | 5/1982 | Woodward |
| 4,922,713 | A | * | 5/1990 | Barbarin et al. ............ 60/226.2 |
| 5,524,847 | A | | 6/1996 | Brodell et al. |
| 5,577,381 | A | | 11/1996 | Eigenbrode et al. |
| 5,586,431 | A | | 12/1996 | Thonebe et al. |
| 5,593,112 | A | | 1/1997 | Maier et al. |
| 5,655,360 | A | | 8/1997 | Butler |
| 5,778,659 | A | | 7/1998 | Duesler et al. |
| 5,806,302 | A | | 9/1998 | Cariola et al. |
| 5,833,140 | A | * | 11/1998 | Loffredo et al. ......... 239/265.37 |
| 5,853,148 | A | | 12/1998 | Standish et al. |
| 2002/0069637 | A1 | * | 6/2002 | Becquerelle et al. ........ 60/226.1 |
| 2006/0101807 | A1 | | 5/2006 | Wood et al. |
| 2010/0064659 | A1 | * | 3/2010 | Wang .......................... 60/226.2 |

FOREIGN PATENT DOCUMENTS

FR  1503425  3/1978
GB  2189550  10/1987

OTHER PUBLICATIONS

Eastman Jacobs, The Characteristics of 78 Related Airfoil Sections From Tests in the Variable-Density Wind Tunnel, Nov. 1933, pp. 2-61.*

* cited by examiner

Primary Examiner — Louis Casaregola
Assistant Examiner — Phutthiwat Wongwian
(74) Attorney, Agent, or Firm — Carlson Gaskey & Olds, P.C.

(57) ABSTRACT

A turbofan engine includes a fan variable area nozzle includes having a first fan nacelle section and a second fan nacelle section movably mounted relative the first fan nacelle section. The second fan nacelle section axially slides aftward relative to the fixed first fan nacelle section to change the effective area of the fan nozzle exit area.

15 Claims, 8 Drawing Sheets

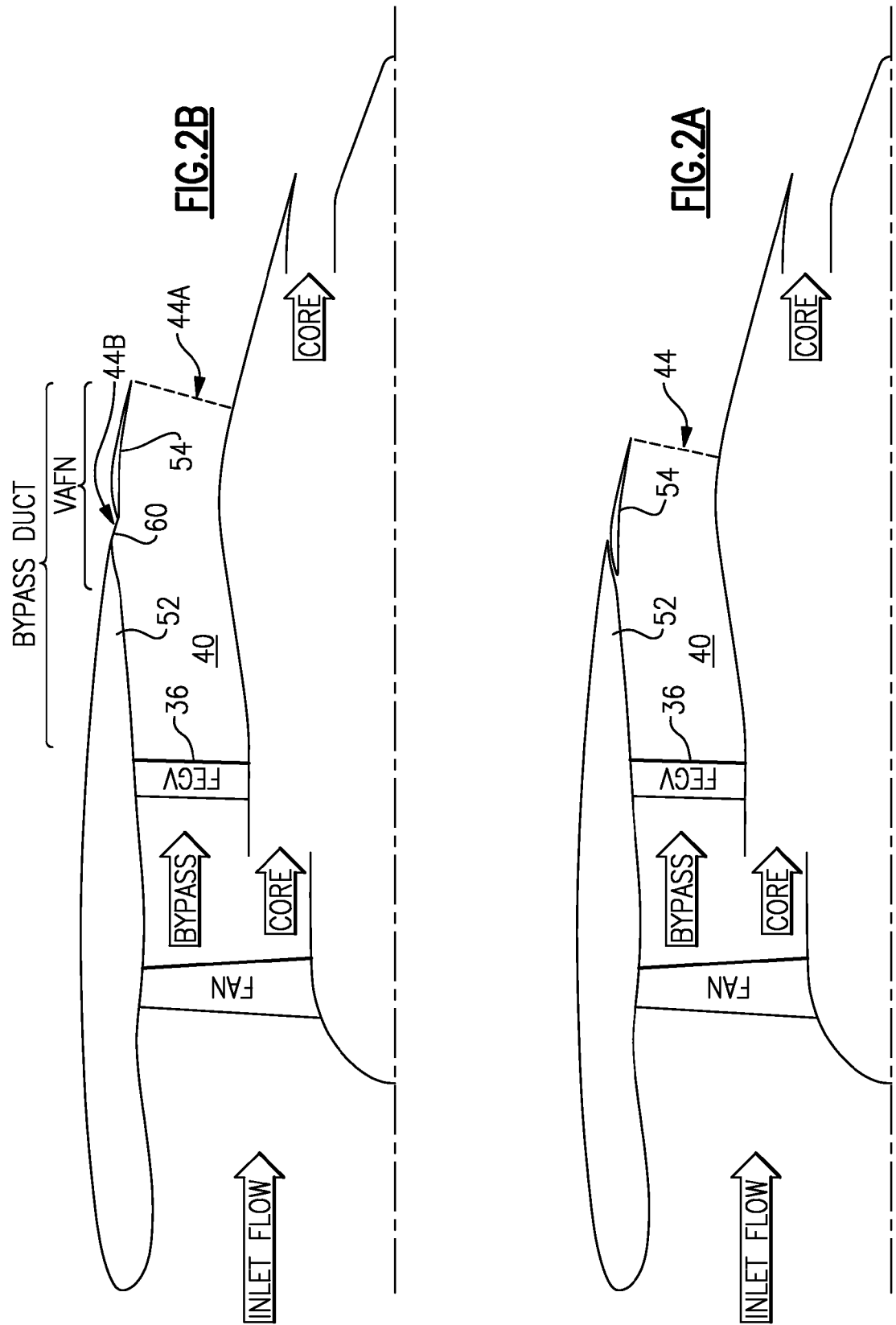

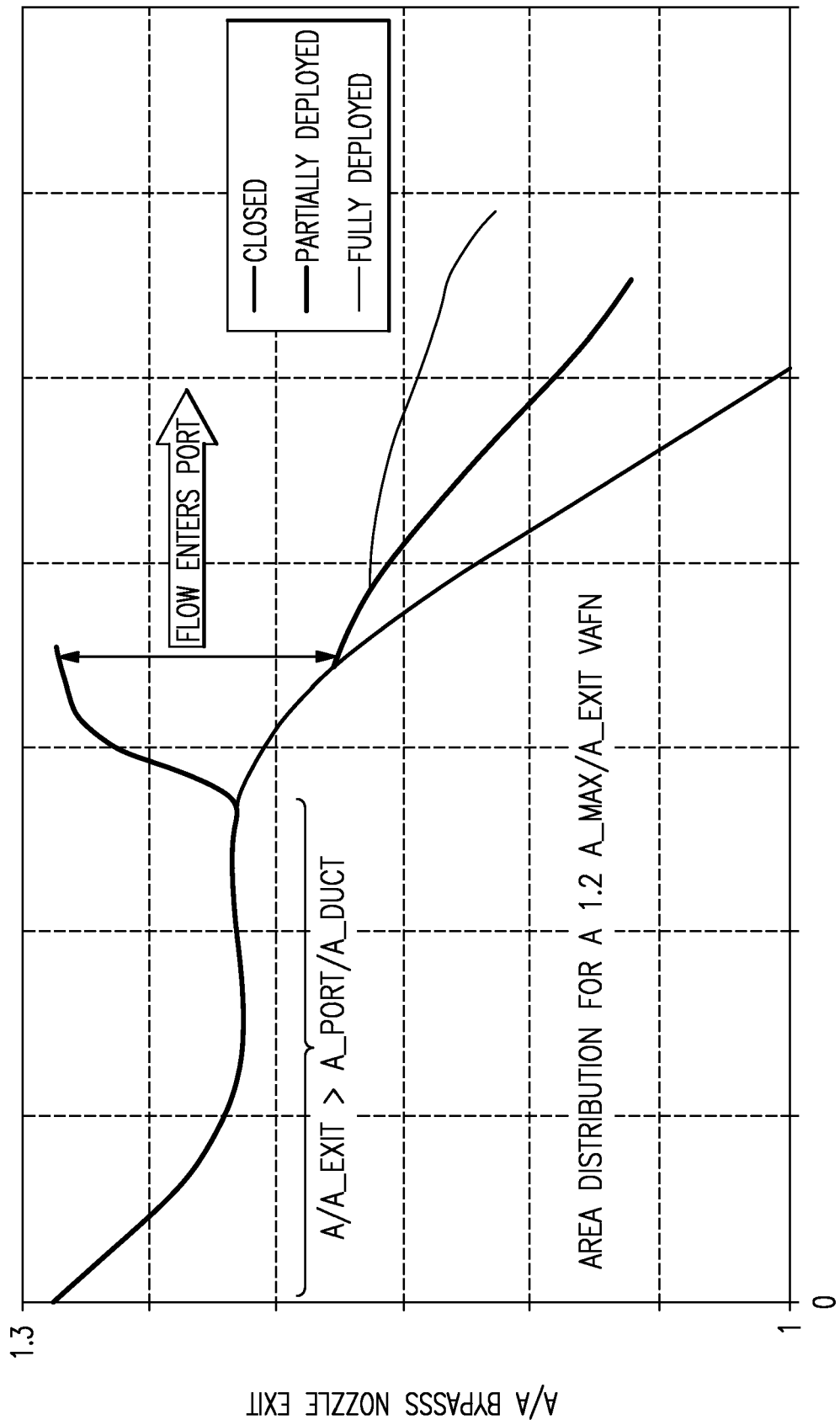

US 8,074,440 B2

GAS TURBINE ENGINE WITH AXIAL MOVABLE FAN VARIABLE AREA NOZZLE

BACKGROUND OF THE INVENTION

The present invention relates to a gas turbine engine, and more particularly to a turbofan engine having a fan variable area nozzle (VAFN) which moves axially to change a bypass flow path area thereof.

Conventional gas turbine engines generally include a fan section and a core engine with the fan section having a larger diameter than that of the core engine. The fan section and the core engine are disposed about a longitudinal axis and are enclosed within an engine nacelle assembly.

Combustion gases are discharged from the core engine through a core exhaust nozzle while an annular fan flow, disposed radially outward of the primary airflow path, is discharged through an annular fan exhaust nozzle defined between a fan nacelle and a core nacelle. A majority of thrust is produced by the pressurized fan air discharged through the fan exhaust nozzle, the remaining thrust being provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzle provide a smaller fan exit nozzle diameter during cruise conditions and a larger fan exit nozzle diameter during take-off and landing conditions. Existing fan variable area nozzles typically utilize relatively complex mechanisms that increase overall engine weight to the extent that the increased fuel efficiency therefrom may be negated.

Accordingly, it is desirable to provide an effective, lightweight fan variable area nozzle for a gas turbine engine.

SUMMARY OF THE INVENTION

A turbofan engine according to the present invention includes a fan variable area nozzle (VAFN) having a first fan nacelle section and a second fan nacelle section movably mounted relative the first fan nacelle section. The second fan nacelle section axially slides relative the fixed first fan nacelle section to change the effective area of the fan nozzle exit area. The VAFN changes the physical area and geometry of the bypass flow path during particular flight conditions. The VAFN is closed by positioning the second fan nacelle section in-line with the first fan nacelle section to define the fan nozzle exit area and is opened by moving the second fan nacelle section aftward to provide an increased fan nozzle exit area.

In operation, the VAFN communicates with the controller to effectively vary the area defined by the fan nozzle exit area. By adjusting the entire periphery of the second fan nacelle section in which all sectors are moved simultaneously, engine thrust and fuel economy are maximized during each flight regime by varying the fan nozzle exit area. By separately adjusting circumferential sectors of the second fan nacelle section to provide an asymmetrical fan nozzle exit area, engine bypass flow is selectively vectored to provide, for example only, trim balance, thrust controlled maneuvering, enhanced ground operations and short field performance.

The present invention therefore provides an effective, lightweight fan variable area nozzle for a gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2A is a sectional side view of the VAFN in a closed position;

FIG. 2B is a sectional side view of the VAFN in an open position; and

FIG. 5 is a graph of a duct area distribution;

DETAILED DESCRIPTION OF THE PREFERRED EMBODIMENT

Figure 1A:
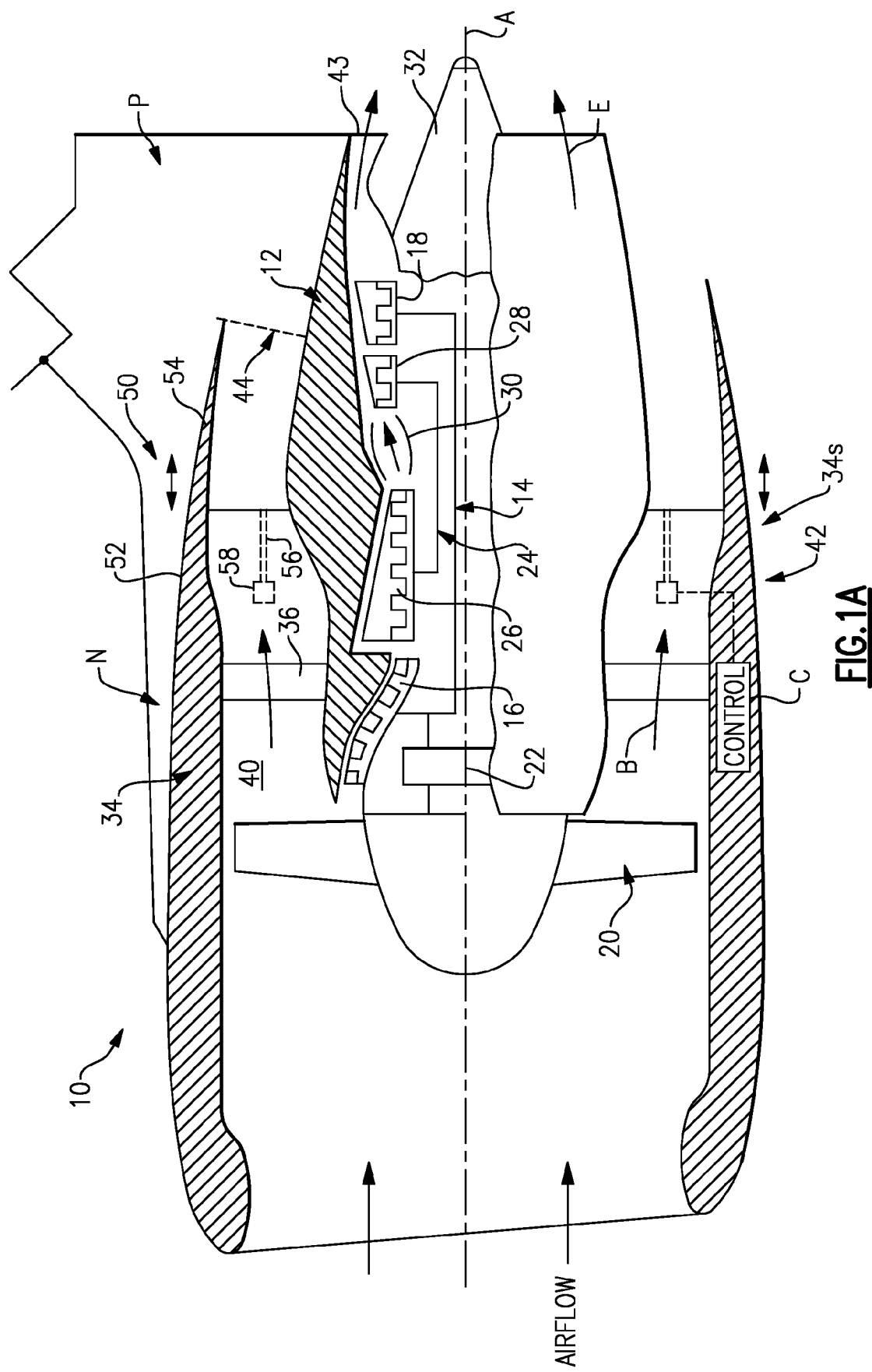
FIG. 1A is a general schematic partial fragmentary view of an exemplary gas turbine engine embodiment for use with the present invention.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared architecture aircraft engine. In one disclosed embodiment, the engine 10 bypass ratio is greater than ten (10:1), the turbofan diameter is significantly larger than that of the low pressure compressor 16, and the low pressure turbine 18 has a pressure ratio that is greater than 5:1. The gear train 22 may be an epicycle gear train such as a planetary gear system or other gear system with a gear reduction ratio of greater than 2.5:1. It should be understood, however, that the above parameters are only exemplary of one embodiment of a geared architecture engine and that the present invention is applicable to other gas turbine engines including direct drive turbofans.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by structure 36 often generically referred to as Fan Exit Guide Vanes (FEGVs). A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular fan bypass flow path 40 and is discharged from the engine 10 through a fan variable area nozzle (VAFN) 42 which defines a fan nozzle exit area 44 between the fan nacelle 34 and the core nacelle 12 at a fan nacelle end segment 34S of the fan nacelle 34 downstream of the fan section 20.

Thrust is a function of density, velocity, and area. One or more of these parameters can be manipulated to vary the amount and direction of thrust provided by the bypass flow B. The VAFN 42 operates to effectively vary the area of the fan nozzle exit area 44 to selectively adjust the pressure ratio of the bypass flow B in response to a controller C. Low pressure ratio turbofans are desirable for their high propulsive efficiency. However, low pressure ratio fans may be inherently susceptible to fan stability/flutter problems at low power and low flight speeds. The VAFN allows the engine to change to a more favorable fan operating line at low power, avoiding the instability region, and still provide the relatively smaller nozzle area necessary to obtain a high-efficiency fan operating line at cruise.

A significant amount of thrust is provided by the bypass flow B due to the high bypass ratio. The fan section 20 of the engine 10 is preferably designed for a particular flight condition—typically cruise at 0.8M and 35,000 feet. As the fan blades within the fan section 20 are efficiently designed at a particular fixed stagger angle for an efficient cruise condition, the VAFN 42 is operated to effectively vary the fan nozzle exit area 44 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 1B:
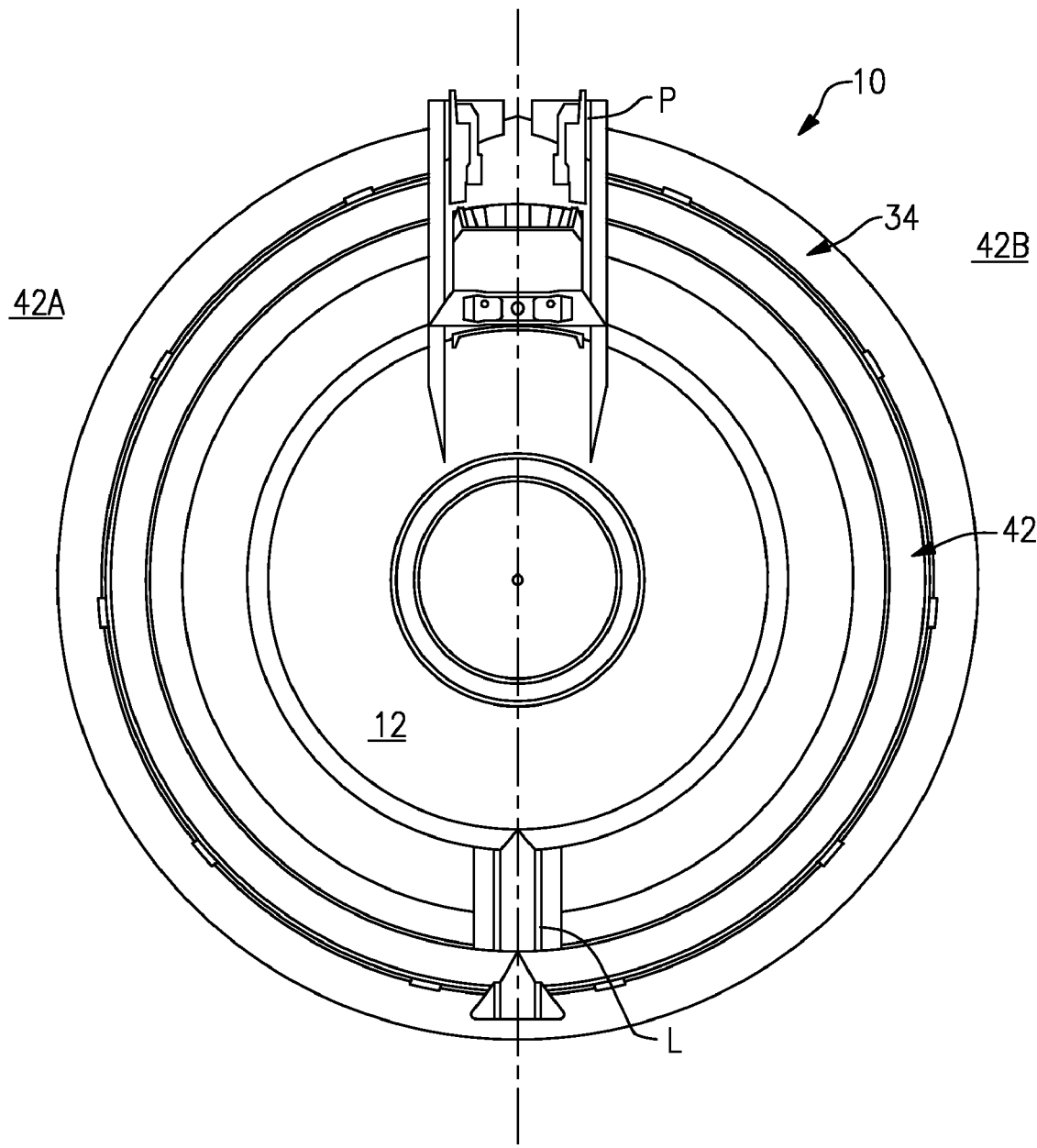
FIG. 1B is a rear view of the engine.
Figure 1C:
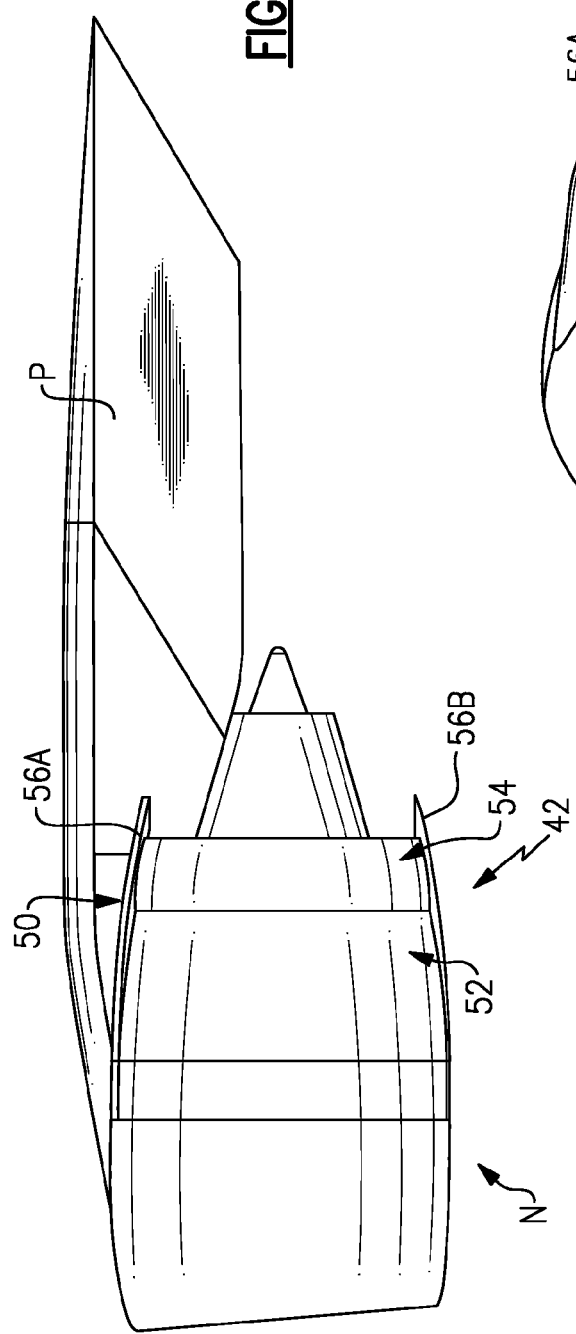
FIG. 1C is a side view of the engine integrated with a pylon.
Figure 1D:
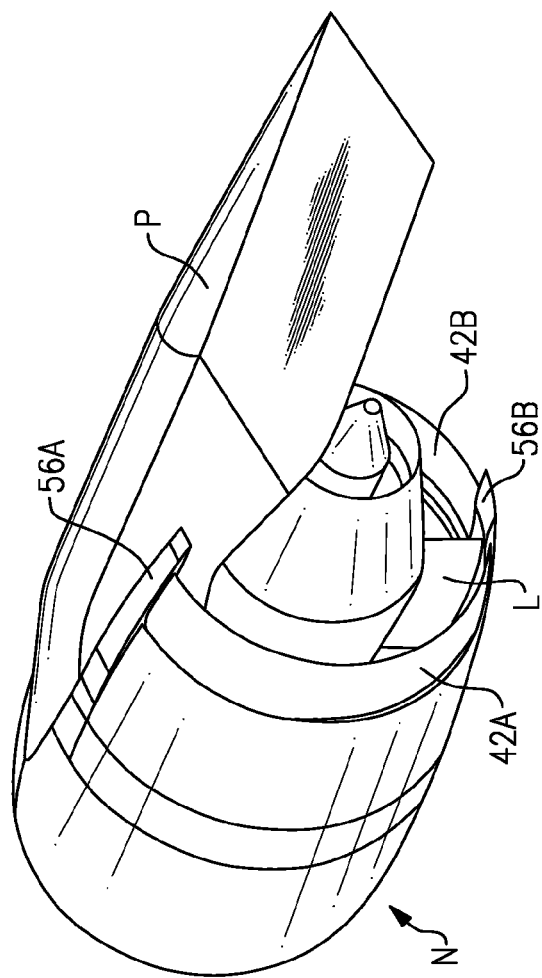
FIG. 1D is a perspective view of the engine integrated with a pylon.

The VAFN 42 is separated into at least two sectors 42A-42B (FIG. 1B) defined between the pylon P and a lower Bi-Fi splitter L which typically interconnects a larger diameter fan duct reverser cowl and a smaller diameter core cowl (FIGS. 1C and 1D). Each of the at least two sectors 42A-42B are independently adjustable to asymmetrically vary the fan nozzle exit area 44 to generate vectored thrust. It should be understood that although two segments are illustrated, any number of segments may alternatively or additionally be provided.

In operation, the VAFN 42 communicates with a controller C or the like to adjust the fan nozzle exit area 44 in a symmetrical and asymmetrical manner. Other control systems including an engine controller or aircraft flight control system may also be usable with the present invention. By adjusting the entire periphery of the VAFN 42 symmetrically in which all sectors are moved uniformly, thrust efficiency and fuel economy are maximized during each flight condition. By separately adjusting the circumferential sectors 42A-42B of the VAFN 42 to provide an asymmetrical fan nozzle exit area 44, engine bypass flow is selectively vectored to provide, for example only, trim balance or thrust controlled maneuvering enhanced ground operations or short field performance.

The VAFN 42 generally includes an auxiliary port assembly 50 having a first fan nacelle section 52 and a second fan nacelle section 54 movably mounted relative the first fan nacelle section 52. The second fan nacelle section 54 axially slides along the engine axis A relative the fixed first fan nacelle section 52 to change the effective area of the fan nozzle exit area 44. The second fan nacelle section 54 slides aftward upon a track fairing 56A, 56B (illustrated schematically in FIGS. 1C and 1D) in response to an actuator 58 (illustrated schematically). The track fairing 56A, 56B extend from the first fan nacelle section 52 adjacent the respective pylon P and the lower Bi-Fi splitter L (FIG. 1D).

The VAFN 42 changes the physical area and geometry of the bypass flow path 40 during particular flight conditions. The bypass flow B is effectively altered by sliding of the second fan nacelle section 54 relative the first fan nacelle section 52 between a closed position (FIG. 2A) and an open position (FIG. 2B). The auxiliary port assembly 50 is closed by positioning the second fan nacelle section 54 in-line with the first fan nacelle section 52 to define the fan nozzle exit area 44 as exit area F0 (FIG. 2A).

The VAFN 42 is opened by moving the second fan nacelle section 54 aftward along the track fairing 56A, 56B away from the first fan nacelle section 52 to open an auxiliary port 60 which extends between the open second fan nacelle section 54 relative the first fan nacelle section 52 to essentially provide an increased fan nozzle exit area 44 exit area F1. That is, the exit area F1 with the port 60 is greater than exit area F0 (FIG. 2B).

In one disclosed embodiment, the auxiliary port 60 is incorporated into the exhaust system of a high bypass ratio commercial turbofan engine within the bypass duct aft of the Fan Exit Guide Vanes (FEGVs; FIGS. 2A, 2B). The auxiliary port 60 is located in the aft section of the bypass duct outer wall.

Figure 3:
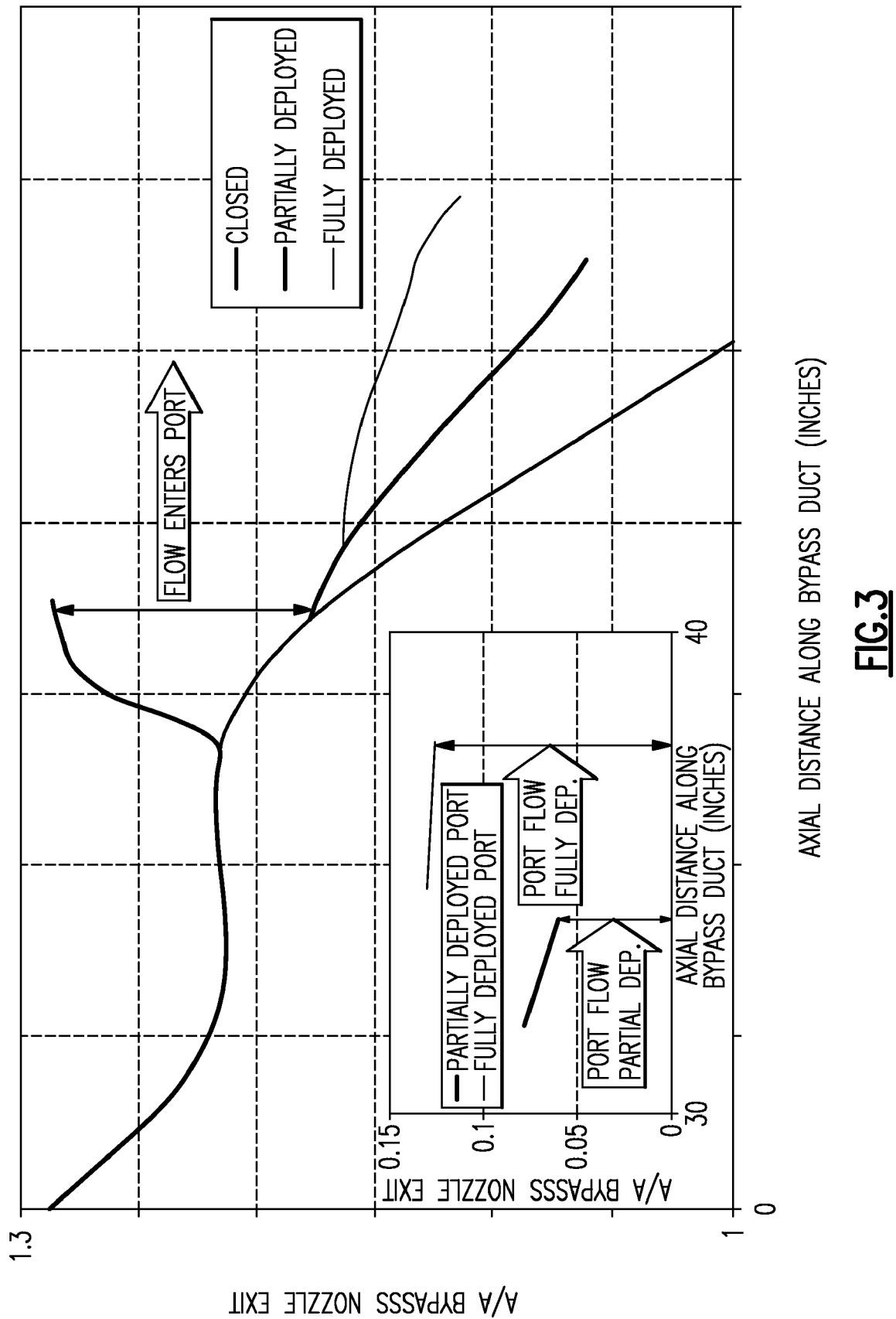
FIG. 3 is a graph of a bypass duct normalized cross-sectional area distribution.
Figure 4:
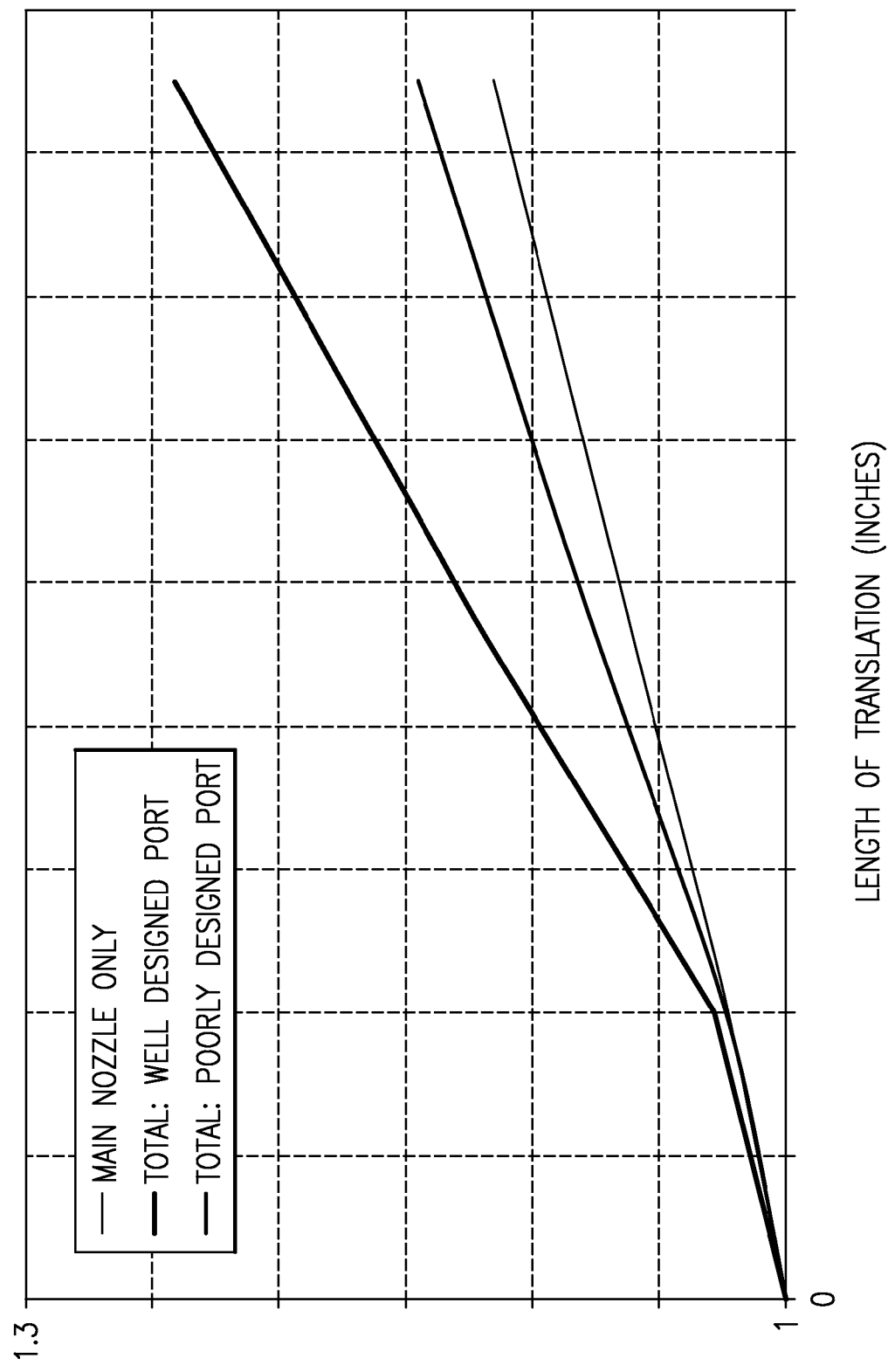
FIG. 4 is a graph of a Effective Area Increase vs. Nozzle Translation.

Referring to FIG. 3, the bypass duct area distribution, the effective area increase vs. translation (FIG. 4), area distribution (FIG. 5), and auxiliary port 60 location (FIG. 6A) and wall curvatures (FIG. 6B-6C) are tailored to provide a proper flow-field that allows the auxiliary port 60 to obtain the required additional effective exit area. The auxiliary port 60 will essentially double the effective area gain due to translation. The auxiliary port 60 provides a relatively low weight method of providing increased exit area to control the fan operating line without causing high system losses or unacceptable aircraft installation issues. By tailoring the bypass duct area distribution and outer wall curvature, the desired maximum effective area increase is achieved before the stroke of the auxiliary port 60 reaches its effective area increase limit.

The auxiliary port exit plane 44B (defined as the plane between the stationary section's trailing edge and the moving sections leading edge) initially has an opening in which the exit plane normal vector is near-axial, but as the stroke increases, the normal vector becomes more inclined and approaches a near-radial vector. Once the exit plane normal has become near-radial, the maximum auxiliary port effectiveness has been reached. Once this point is reached, the rate of the effective area vs. translation changes from steep slope of the "well designed port"the shallow rate of the "main nozzle only", since additional area will be provided through the main nozzle 44A due to the inward slope of the core nacelle 12. A well designed auxiliary port nozzle will achieve approximately +25% effective area before the port effectiveness limit is reached. That is, there is a limited range of stroke in which the auxiliary port doubles the rate of additional effectiveness. Outside of this range, the rate of additional effectiveness may be equivalent to a translating nozzle that has no auxiliary port. Or put another way, the auxiliary port reduces the stroke necessary for a pure translating nozzle to achieve a desired effective area.

Referring to FIG. 5, the cross-sectional area at the auxiliary port 60 is greater than the maximum required effective area of the VAFN 42 and the bypass duct area distribution is tailored to ensure the duct cross-sectional area forward of the auxiliary port 60 is greater than the port opening cross-sectional area. This avoids a situation where an upstream internal cross-section becomes the controlling flow area (i.e. is smaller than the exit area), which can lead to operational limits and structural issues.

Figure 6A:
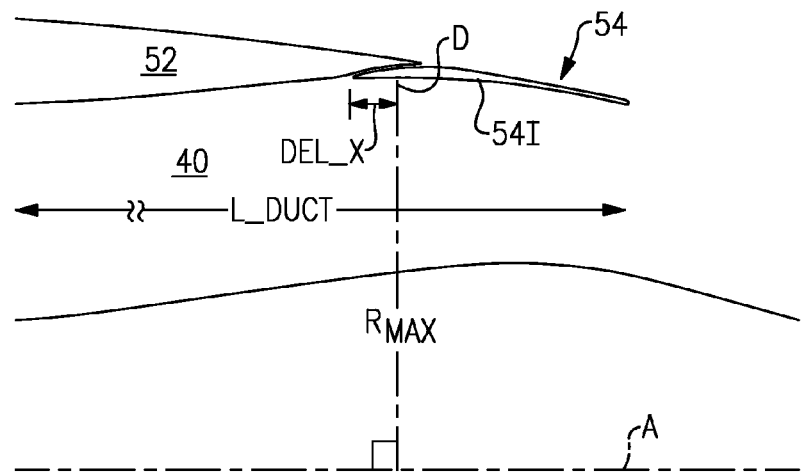
FIG. 6A is schematic geometric view of the auxiliary port location.
Figure 6B:
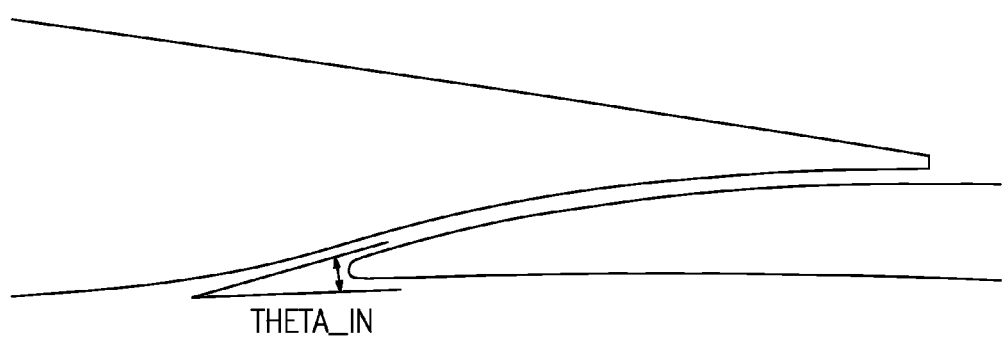
FIG. 6B is schematic geometric view of the auxiliary port entrance angle.
Figure 6C:
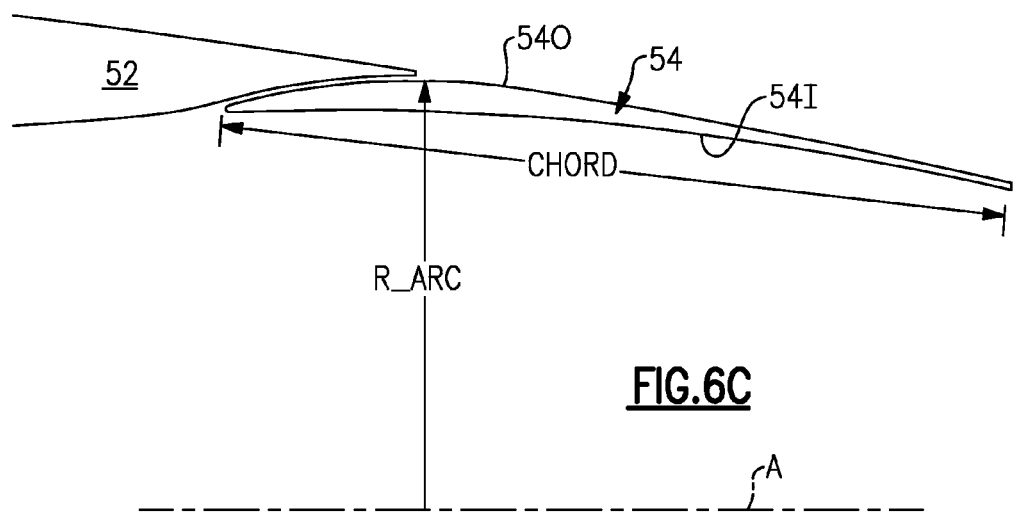
FIG. 6C is schematic geometric view of a VAFN outer surface curvature.

Referring to FIG. 6A, the auxiliary port 60 in the disclosed embodiment, is located no more forward than 0.1 DEL_X/L_DUCT defined from a point D at the largest radius Rmax of the annular fan bypass flow path 40 defined by the second fan nacelle section 54. Rmax is defined through point D and perpendicular to the engine axis A. Point D in the disclosed non limiting embodiment is located on an inner wall surface 54I of the second fan nacelle section 54 when the second fan nacelle section 54 is in a closed position. DEL_X is the axial distance to the forward most point of the auxiliary port 60 from Rmax. L_DUCT is the overall axial length of the annular fan bypass flow path 40. The angle between the mean port line and the fan duct outer wall is relatively low to provide well-behaved, low loss exit flow. In the disclosed embodiment, the auxiliary port 60 entrance angle (Theta_in) relative to the fan bypass duct OD wall, is less than 20 degrees (FIG. 6B) while the outer VAFN surface has an R_ARC/CHORD>0.7 where R_ARC is a radial distance from the engine axis A to a radial outer wall surface 54O of the second fan nacelle section 54 and CHORD is the chord length of the second fan nacelle section 54. (FIG. 6C). The curvature of the outer wall surface 54O near the auxiliary port 60 promotes flow through the auxiliary port 60. In one disclosed embodiment, the stroke of the second fan nacelle section 54 necessary to obtain an additional 20% effective exit area is approximately 8.4 inches.

In operation, the VAFN 42 communicates with the controller C to move the second fan nacelle section 54 relative the first fan nacelle section 52 of the auxiliary port assembly 50 to effectively vary the area defined by the fan nozzle exit area 44. Various control systems including an engine controller or an aircraft flight control system may also be usable with the present invention. By adjusting the axial position of the entire periphery of the second fan nacelle section 54 in which all sectors are moved simultaneously, engine thrust and fuel economy are maximized during each flight regime by varying the fan nozzle exit area. By separately adjusting the sectors of the second fan nacelle section 54 to provide an asymmetrical fan nozzle exit area 44, engine bypass flow is selectively vectored to provide, for example only, trim balance, thrust controlled maneuvering, enhanced ground operations and short field performance.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A nacelle assembly for a high-bypass gas turbine engine comprising:
   a core nacelle defined about an engine centerline axis;
   a fan nacelle mounted at least partially around said core nacelle to define an annular fan bypass flow path; and
   a fan variable area nozzle in communication with said fan bypass flow path, said fan variable area nozzle having a first fan nacelle section and a second fan nacelle section, said second fan nacelle section axially movable relative said first fan nacelle section to define an auxiliary port to vary a fan nozzle exit area and adjust fan bypass airflow, said auxiliary port no more forward than 0.1 DEL_X/L_DUCT from a maximum radius of said annular fan bypass flow path, wherein DEL_X is the axial distance from said maximum radius to a forward most point of said auxiliary port and L_DUCT is the axial length of said annular fan bypass flow path.

2. The assembly as recited in claim 1, wherein said second fan nacelle section defines an auxiliary port entrance angle, said auxiliary port entrance angle relative to said first fan nacelle section less than 20 degrees.

3. The assembly as recited in claim 1, wherein an outer surface of said second fan nacelle section defines an R_ARC/CHORD greater than 0.7 where R_ARC is a radial distance from said engine axis to a radial outer wall surface of said second fan nacelle section and CHORD is the chord length of said second fan nacelle section.

4. The assembly as recited in claim 1, wherein said second fan nacelle section defines an auxiliary port entrance angle, said auxiliary port entrance angle relative to said first fan nacelle section less than 20 degrees, and an outer surface of said second fan nacelle section defines an R_ARC/CHORD greater than 0.7 where R_ARC is a radial distance from said engine axis to a radial outer wall surface of said second fan nacelle section and CHORD is the chord length of said second fan nacelle section.

5. The assembly as recited in claim 1, wherein said second fan nacelle section includes a first segment defined between a pylon and a lower bifi and a second segment defined between said pylon and said lower bifi.

6. The assembly as recited in claim 1, wherein said second fan nacelle section defines a trailing edge of said fan variable area nozzle.

7. The assembly as recited in claim 1, wherein said second fan nacelle section is subdivided into a multiple of independently operable sectors, each of said multiple of independently operable sectors axially movable relative said the first fan nacelle section to define an asymmetric fan nozzle exit area.

8. A nacelle system for a high-bypass gas turbine engine comprising:
   a core engine defined about an axis;
   a gear system driven by said core engine;
   a turbofan driven by said gear system about said axis;
   a core nacelle defined at least partially about said core engine;
   a fan nacelle mounted at least partially around said core nacelle to define a fan bypass flow path; and
   a fan variable area nozzle in communication with said fan bypass flow path, said fan variable area nozzle having a first fan nacelle section and a second fan nacelle section, said second fan nacelle section axially movable relative said first fan nacelle section to define an auxiliary port to vary a fan nozzle exit area and adjust fan bypass airflow, said auxiliary port no more forward than 0.1 DEL_X/L_DUCT from a maximum radius of said annular fan bypass flow path, wherein DEL_X is the axial distance from said maximum radius to a forward most point of said auxiliary port and L_DUCT is the axial length of said annular fan bypass flow path.

9. The system as recited in claim 8, wherein said second fan nacelle section defines an auxiliary port entrance angle, said auxiliary port entrance angle relative to said first fan nacelle section less than 20 degrees.

10. The system as recited in claim 8, wherein an outer surface of said second fan nacelle section defines an R_ARC/CHORD greater than 0.7 where R_ARC is a radial distance from said engine axis to a radial outer wall surface of said second fan nacelle section and CHORD is the chord length of said second fan nacelle section.

11. The system as recited in claim 8, wherein said second fan nacelle section defines an auxiliary port entrance angle, said auxiliary port entrance angle relative to said first fan nacelle section less than 20 degrees, and an outer surface of said second fan nacelle section defines an R_ARC/CHORD greater than 0.7 where R_ARC is a radial distance from said engine axis to a radial outer wall surface of said second fan nacelle section and CHORD is the chord length of said second fan nacelle section.

12. The system as recited in claim 8, further comprising a controller in communication with an actuator system to axially move said second fan nacelle section relative to said first fan nacelle section to vary said fan nozzle exit area in response to a flight condition.

13. The system as recited in claim 12, wherein said second fan nacelle section is aligned with said first fan nacelle section about said axis to define a closed position of said fan nozzle exit area.

14. The system as recited in claim 13, wherein said second fan nacelle section is axially offset relative said first fan nacelle section along said track to define an open position of said fan nozzle exit area.

15. The system as recited in claim 8, wherein said second fan nacelle section axially movable generally along said track to vary a fan nozzle exit area to adjust fan bypass airflow such that an angle of attack of turbofan fan blades are maintained close to design incidence.

* * * * *